(12) United States Patent
Jechumtalova et al.

(10) Patent No.: US 7,647,183 B2
(45) Date of Patent: Jan. 12, 2010

(54) METHOD FOR MONITORING SEISMIC EVENTS

(75) Inventors: Zuzana Jechumtalova, Prague (CZ); Leo Eisner, Cambridge (GB)

(73) Assignee: Schlumberger Technology Corporation, Cambridge, MA (US)

( * ) Notice: Subject to any disclaimer, the term of this patent is extended or adjusted under 35 U.S.C. 154(b) by 8 days.

(21) Appl. No.: 11/838,596

(22) Filed: Aug. 14, 2007

(65) Prior Publication Data
US 2009/0048783 A1  Feb. 19, 2009

(51) Int. Cl.
G01V 1/00 (2006.01)
G01V 1/28 (2006.01)
(52) U.S. Cl. ...................................... 702/14
(58) Field of Classification Search ............... 702/14, 702/6, 7, 9, 11, 16–18; 324/303, 333, 337–339; 367/28, 35, 38, 45, 46, 50–53, 73, 75
See application file for complete search history.

(56) References Cited
U.S. PATENT DOCUMENTS

| | | | |
|---|---|---|---|
| 5,777,477 A * | 7/1998 | Wynn ......................... | 324/345 |
| 6,292,754 B1 * | 9/2001 | Thomsen ...................... | 702/14 |
| 2004/0100263 A1 * | 5/2004 | Fanini et al. ................ | 324/339 |
| 2005/0190649 A1 * | 9/2005 | Eisner et al. ................. | 367/38 |
| 2007/0219723 A1 * | 9/2007 | Tabarovsky et al. ........... | 702/9 |
| 2007/0234787 A1 * | 10/2007 | Rabinovich et al. ........ | 73/152.02 |
| 2007/0274155 A1 * | 11/2007 | Ikelle ......................... | 367/38 |
| 2008/0004847 A1 * | 1/2008 | Bradford ...................... | 703/10 |
| 2008/0030196 A1 * | 2/2008 | Bespalov et al. ............. | 324/339 |
| 2008/0062814 A1 * | 3/2008 | Prioul et al. ................... | 367/31 |
| 2008/0151691 A1 * | 6/2008 | Eisner et al. ................... | 367/38 |

OTHER PUBLICATIONS

Dahm et al: "Automated moment tensor inversion to estimate source mechanisms of hydraulically induced micro-seismicity in salt rock", Tectonophysics, 306, 1999, pp. 1-17.
Jechumtalova et al: "Amplitude ratios for complete moment tensor retrieval", Geophysical Research Letters, 32, 2005, L22303, pp. 1-4.
Jechumtalova et al: "Point-source parameters from noisy waveforms: error estimate by Monte Carlo simulation", Pure and applied geophysics, 158, 2001, pp. 1639-1654.
Maxwell et al: "Real-time microseismic mapping of hydraulic fractures in Carthage, Texas", 70th Annual International Meeting, SEG, Expanded Abstracts, 2000, pp. 1449-1452.
Moriya et al: "Precise source location of AE doublets by spectral matrix analysis of triaxial hodogram", Geophysics, vol. 59, No. 1, 1994, pp. 36-45.

(Continued)

*Primary Examiner*—Michael P. Nghiem
*Assistant Examiner*—Cindy H Khuu
(74) *Attorney, Agent, or Firm*—James McAleenan; Jody Lynn DeStefanis; Brigid Laffey

(57) ABSTRACT

A microseismic method of monitoring fracturing operation or other microseismic events in hydrocarbon wells is described using the steps of obtaining multi-component signal recordings from a single monitoring well in the vicinity of a facture or event; and rotating observed signals such that they become independent of at least one component of the moment tensor representing the source mechanism and performing an inversion of the rotated signals to determine the remaining components.

14 Claims, 4 Drawing Sheets

OTHER PUBLICATIONS

Nolen-Hoeksema et al: "Moment tensor inversion of microseisms from the B-sand propped hydrofracture", M-site, Colorado, Tectonophysics, 336, 2001, pp. 163-181.

Nolen-Hoeksema et al: "Moment tensor inversion of microseismic events from hydrofractures", SEG 1999 Expanded Abstracts.

Pearson: "The relationship between microseismicity and high pore pressures during hydraulic stimulation experiments in low permeability granitic rocks", Journal of Geophysical Research, vol. 86, No. B9, 1981, pp. 7855-7864.

Phillips et al: "Induced microearthquake patterns and oil-producing fracture systems in the Austin chalk", Tectonophysics, vol. 289, 1998, pp. 153-169.

Riedesel et al: "Display and assessment of seismic moment tensors", Bulletin of the Seismological Society of America, vol. 79, No. 1, 1989, pp. 85-100.

Rutledge et al: "Hydraulic stimulation of natural fractures as revealed by induced microearthquakes, Carthage Cotton Valley gas field, east Texas", Geophysics, vol. 68, No. 2, 2003, pp. 441-452.

Vavrycuk: "Inversion for parameters of tensile earthquakes", Journal of Geophysical Research, 106, B8, 2001, pp. 16,339-16,355.

Vavrycuk: "On the retrieval of moment tensors from borehole data", Geophysical Prospecting, 55, 2007, pp. 381-391.

Trifu: "Reliability of Seismic Moment Tensor Inversions for Induced Microseismicity at Kidd Mine, Ontario", Pure and Applied Geophysics, 159, 2002, pp. 145-164.

Ferdinand: "The Determination of Source Mechanisms of Small Earthquakes and Revised Models of Local Crustal Structure by Moment Tensor Inversion", Geophysical Journal International, vol. 151, 2002, pp. 221-234.

* cited by examiner

METHOD FOR MONITORING SEISMIC EVENTS

Embodiments of this invention relate to methods for monitoring seismic events, particularly microseismic events caused or relating to human activity in a subterranean reservoir or borehole. More specifically, but not by way of limitation, embodiments of the present invention relate to such methods for determining source characteristics and location of such events.

BACKGROUND OF THE INVENTION

Seismic monitoring is known as a method with an observation horizon that penetrates far deeper into a hydrocarbon reservoir than any other method employed in the oilfield industry. It has been proposed to exploit the reach of seismic methods for the purpose of reservoir monitoring.

In conventional seismic monitoring a seismic source, such as airguns, vibrators or explosives are activated and generate sufficient acoustic energy to penetrate the earth. Reflected or refracted parts of this energy are then recorded by seismic receivers such as hydrophones and geophones.

In microseismic monitoring the seismic energy is generated through so-called local microseismic events either naturally occurring in the formation or caused by human activity or intervention. The events include seismic events caused by fracturing operations to be described in more detail below, by very small sources injected for example with wellbore fluids, or background events illuminating the area of interest. Those variants of the microseismic methods which lack an actively controlled seismic source are sometimes also referred to as passive seismic monitoring. For the purpose of the present invention, microseismic shall include all of the above described variants.

Referring now in more detail to hydraulic fracturing operations, it is known that production or storage capacity of underground reservoirs can be improved using a procedure known as hydraulic fracturing. Hydraulic fracturing operations are for example commonly performed in formations where oil or gas cannot be easily or economically extracted from the earth from drilled and perforated wellbores alone.

These operations include the steps of pumping through a borehole large amounts of fluid to induce cracks in the earth, thereby creating pathways via which the oil and gas can flow more readily than prior to the fracturing. After a crack is generated, sand or some other proppant material is commonly injected into the crack, such that a crack is kept open even after release of the applied pressure. The particulate proppant provides a conductive pathway for the oil and gas to flow through the newly formed fracture into the main wellbore.

The hydraulic fracturing processes cannot be readily observed, since they are typically thousands of feet or meters below the surface of the earth. Therefore, members of the oil and gas industry have sought diagnostic methods to tell where the fractures are, how big the fractures are, how far they go and how high they grow. As mentioned above, one method of observing fracturing operations has been found in the use of microseismic monitoring.

Apart from the problem of detecting the often faint microseismic events as such, the interpretation of microseismic signals is difficult as often neither the source location nor the source signature or characteristics are known prior to a processing of the measurements. However knowledge of these parameters is important to deduce further reservoir parameters knowledge of which would improve reservoir control. If for example the precise location and the moment tensor of the source or event which caused a seismic wave are required for the further processing and interpretation of the recorded signals or data, then such parameters have to be inferred from the recordings.

Details of known microseismic monitoring methods can be found for example in for example the following publications:

Maxwell S. C., Urbancic T. I., Falls S. D., Zinno R.: "Real-time microseismic mapping of hydraulic fractures in Carthage", Texas, 70th Annual International Meeting, SEG, Expanded Abstracts, 1449-1452 (2000);

Moriya, H., K. Nagano and H. Niitsuma: "Precise source location of AE doublets by spectral matrix analysis of the triaxial hodogram", Geophysics, 59, 36-45 (1994);

Pearson, C: "The relationship between microseismicity and high pore pressures during hydraulic stimulation experiments in low permeability granitic rocks", Journ. Of Geophys Res. 86 (B9), 7855-7864 (1981);

Phillips W. S., T. D. Fairbanks, J. T. Rutledge, D. W. Anderson: Induced microearthquake patterns and oil-producing fracture systems in the Austin chalk. Tectonophysics, 289, pp. 153-169(1998); and Rutledge, J. T. and Phillips, W. S. (2003): Hydraulic stimulation of natural fractures as revealed by induced microearthquakes, Carthage Cotton Valley gas field, east Texas. Geophysics, 68, 441-452.

Known methods for representing and inverting measured signals for moment tensors are described for example in the published US patent application US 2005/0190649 A1 to Eisner and in publications cited in relation to this application and include:

Riedesel, M. A., and T. H. Jordan, Display and assessment of seismic moment tensors, Bull. Seism. Soc. Am., 79, 85-100 (1989).

Dahm, T. et al Automated moment tensor inversion to estimate source mechanisms of hydraulicallly induced micro-seismicity in salt rock, Tectonophysics 306, 1-17 (1999);

Nolen-Hoeksema, R. C. and L. J. Ruff, Moment tensor inversion of microseismic events from hydrofractures, SEG 1999 expanded abstracts (1999);

Nolen-Hoeksema, R. C., and L. J. Ruff, Moment tensor inversion of microseism from the B-sand propped hydrofracture, M-site, Colorado. Tectonophysics, 336, 163-181(2001);

Jechumtálová, Z., and J. Silený, Point-source parameters from noisy waveforms: error estimate by Monte Carlo simulation. Pure Appl. Geophys., 158,1639-1654 (2001);

Vavryčuk, V., Inversion for parameters of tensile earthquakes. J. Geophys. Res., 106 (B8), 16339-16355 (2001);

Jechumtálová, Z., and J. Sílený, Amplitude ratios for complete moment tensor retrieval. Geophys. Res. Lett., 32, L22303 (2005); and Vavryčuk, V. On the retrieval of moment tensors from borehole data. Geophysical Prospecting, 55 (3), 381-391(2007).

The present invention seeks to improve the accuracy of source related parameters derived from microseismic signals, particularly for monitoring fracturing operations.

SUMMARY OF THE INVENTION

Embodiments of the present invention describe a method of monitoring subterranean formation comprising the steps of obtaining multi-component signals from an essentially single azimuthal direction relative to a location of a microseismic event within the formation; rotating the multi-component signals such that the multi-component signals become independent of at least one of the component of a moment tensor representing source characteristics of the microseismic event and deriving the remaining components of the moment tensor from the rotated multi-component signals.

Preferably the multi-component signal recordings are obtained from a single monitoring well in the vicinity of a facture or other microseismic event.

Preferably the multi-component signal recordings are rotated from their previous coordinate system into a coordinate system with one coordinate axis parallel to a line connecting the location of the event and a receiver.

In the rotated coordinate system the signals become independent of at least one component of the moment tensor and hence can be evaluated or inverted fro the remaining components. It is seen as an advantage of the present method over existing methods of determining the moment tensor that the missing component has no influence on the values of remaining component. No assumption such as zero trace or non-volumetric source mechanisms have to be made to derive the values of the remaining components.

In a preferred embodiment the moment tensor is decomposed into components or subparts which advantageously represent physically distinct aspects of the source mechanism. By evaluating these subparts as functions of the value of the missing component, microseismic events can be classified within or removed from a collection of microseismic events. The functions also provide a method of determining a possible value of the missing component based on external knowledge of the possible mechanisms of the event. A preferred decomposition of the moment tensor is into the volumetric (V), compensated linear vector dipole (CLVD) and double-couple (DC, i.e. the shear part of the source mechanism) subparts. It is also advantageous to apply a similar analysis on dip, rake and strike angles of the event as function of the value of the missing component. Imposing constraints on these angles can also be used to determine a possible best value of the missing component.

Preferably the obtained signals are low-pass or band filtered to a frequency range of 100 Hz or lower, or more preferably to 50 Hz or lower.

These and further aspects of the invention are described in detail in the following examples and accompanying drawings.

BRIEF DESCRIPTION OF THE DRAWINGS

The invention will now be described, by way of example only, with reference to the accompanying drawings, of which.

DETAILED DESCRIPTION

Figure 1:
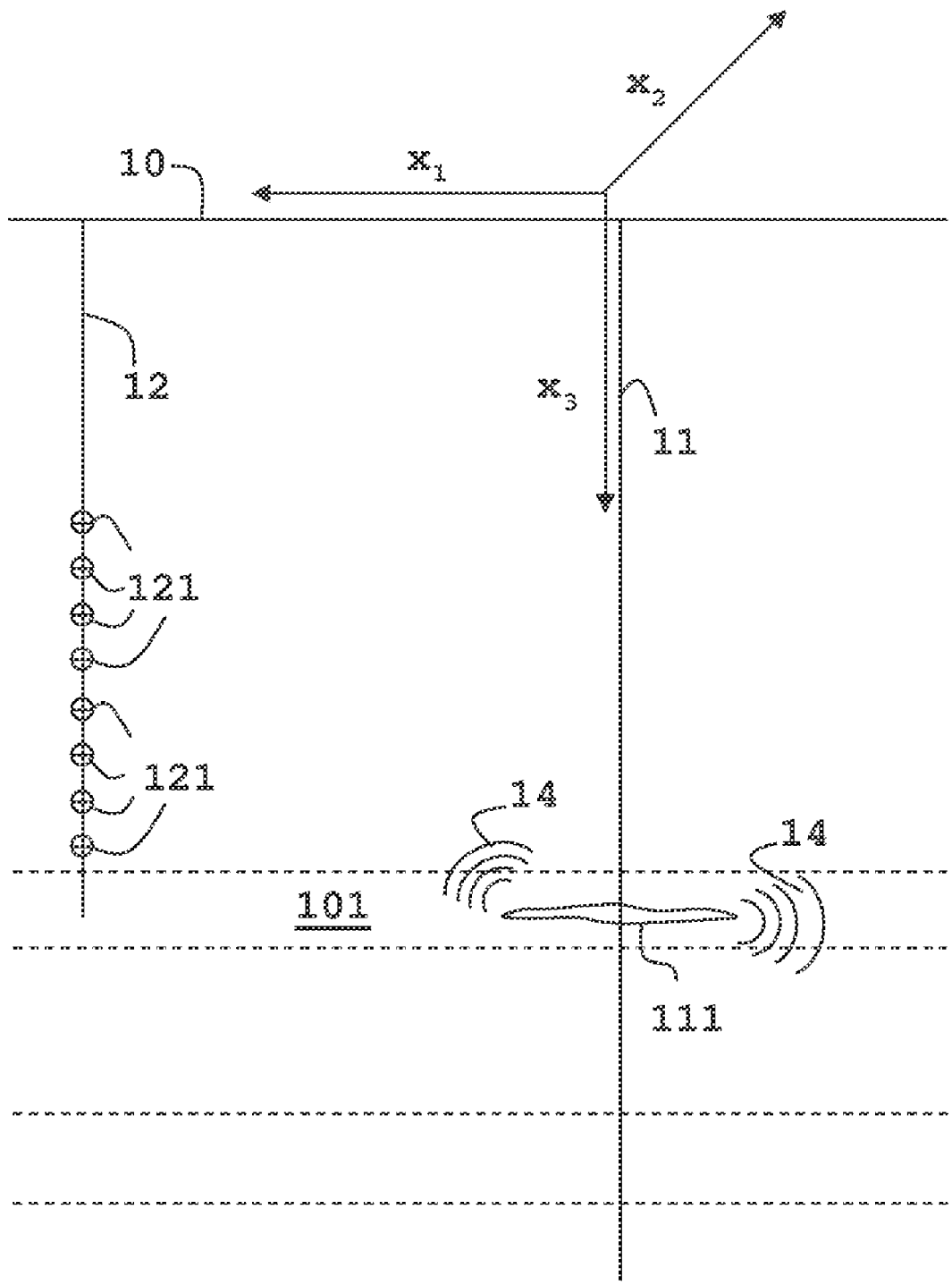
FIG. 1 shows a schematic illustration of a fracturing operation.

A typical operational setting for monitoring hydraulic fracturing in accordance with an example of the present invention is illustrated in FIG. 1.

This figure shows an example of a treatment well 11 and a geophone array 121 of 8 three-component geophones located in a neighboring well 12 the so-called monitoring well. The borehole is located at an approximate distance of 250 meters in horizontal direction with an azimuth of 335° from the source hypocenter. The lowest geophone is 10 meter above the depth of the source and the geophone spacing is 30 meters (i.e., the highest geophone is 220 meters above the source).

During the fracturing operation a fluid is pumped from the surface 10 into the well 11 causing the surrounding formation in a hydrocarbon bearing layer 101 to fracture. Acoustic waves 14 generated by the fracture 111 propagate through the earth and are recorded by the three-components geophones of the array 121.

The present invention assumes that the signals as recorded by the geophones are observed from only one azimuthal direction, i.e. from a single observation well. This direction is denoted as $x_1$. The recorded signals are assumed to be standard three-component geophone recordings.

As has been showed previously for example by Vavryčuk, V. (2007), cited above, the particle displacement in far-field approximation due to a point source (delta function in time and space) the amplitude $u_i$ can be expressed as $$u_i = G_{ij,k} M_{jk}, \quad (1)$$

where G is Green's function for far field and M is moment tensor representing the point source. In a medium which for this example is assumed to be or which can be approximated as 1-D laterally homogeneous isotropic, the Green's function between an arbitrary point source and vertical array of receivers is proportional to the take-off angle s (i.e., vector pointing in the direction of group velocity at the point source) and polarization of a particular wave g. Analogous generalization can be made for anisotropic medium with a vertical axis symmetry (i.e., an axis perpendicular to the 1D layering) in which case the second term in e.q. (1) has to be split for SV and SH waves. Thus G can be re-written as $$G_{ij,k} \propto s_k g_i g_j. \quad (2)$$

When the coordinate system is rotated such that all receivers and the point source are in the $x_1$-$x_3$ plane with $x_3$ denoting the vertical direction, then $$s = (s_1, 0, s_3) \quad (3)$$

for all receivers. Thus in this specific coordinate system the particle displacement due to arbitrary source is not dependent on one of the trace elements (here denoted as $M_{22}$) of the moment tensor and the equation 1 can be rewritten as $$u_i = G_{i1,1} M_{11} + (G_{i1,2} + G_{i2,1}) M_{12} + \quad (4)$$
$$(G_{i1,3} + G_{i3,1}) M_{13} + (G_{i2,3} + G_{i3,2}) M_{23} + G_{i3,3} M_{33}.$$

or in a vector form:

$$\underline{u} = \underline{\underline{\Gamma}} \underline{m} \quad (5)$$

where $\vec{u}$ is observed (measured) displacement vector of three components (rotated into the selected coordinate system), $\vec{\Gamma}$ is three by 5 matrix defined by the Green functions shown in equation (4) (rotated into the selected coordinate system) and $\vec{m}$ is 5 by 1 moment tensor vector also defined by equation (4) (and also rotated into the selected coordinate system).

By rotating the measurements into a coordinate system where one horizontal component is parallel to the horizontal line from treatment well to the monitoring well, one component of the moment tensor no longer influences the recorded (and equally rotated) signals. The rotation matrix required can be the known rotation matrix between two coordinate systems using as argument the rotation angle between the coordinate system of the recording and the coordinate system $x_1$-$x_3$ (the $x_2$ direction can be taken as being perpendicular to both) as defined above.

It is important to note that after having rotated the signals into the coordinate system $x_1$-$x_3$, the problem of resolving or inverting the rotated data $\vec{u}$ for the moment tensor becomes independent of one trace component of the tensor. In other words the value of the component $M_{22}$ can be complete arbitrary or unconstrained. Whatever value this component takes, it has no influence on the other components of the moment tensor. Hence the remaining components can be determined independently of this component from equation (5). No assumption such as the existence of a non-volumetric (deviatoric) source mechanisms have to be made. This is in contrast to the existing methods as proposed for example by Vavryčuk, V. (2007) and Nolen-Hoeksema, R. C., & L. J. Ruff (2001) above, where the moment tensor is constrained to have a zero trace for the purpose of inverting the observed signals.

Given (u), equation (5) can be solved for (m) in a number of ways. In the present example a least-square method is applied, i.e.

$$\underset{\sim}{m} = (\Gamma\Gamma^T)^{-1}\Gamma^T \underset{\sim}{u} \qquad (6)$$

using the Green's function representing response of the medium in this coordinate system. But any other method to determine a best-fit of the five remaining components of the moment tensor to the measured signals can be used.

To find the class of source mechanisms constrained by the data then the source mechanisms composed of the inverted five components completed with a chosen value of $M_{22}$ component. Numerically the sixth component is varied between 10 $M_5$ and 10 $M_5$, where $M_5$ is the maximum absolute value of the five inverted components. The moment tensor with arbitrary value of $M_{22}$ component will have the same synthetic seismograms at all receivers in the $x_1$-$x_3$ plane, thus all such moment tensors have the same normalized residual sum. Consequently the missing component is determined by a further analysis of the signal and the possible source mechanisms.

One method of determining the sixth component of the moment tensor is described in the following. This example uses a decomposition of the moment tensor into the volumetric (V), compensated linear vector dipole (CLVD) and double-couple (DC, i.e. the shear part of the source mechanism) components as described for example in Vavryčuk (2001) as cited above. The V and CLVD percentages are positive for tensile sources and negative for compressive sources. The DC percentage is always positive. The sum of absolute values of the percentages is 100%. Before describing how the missing component can be derived from constraints on the volumetric (V), compensated linear vector dipole (CLVD) and double-couple (DC) components, it worth noting that such a decomposition of the moment tensor is not unique, and other decompositions or methods to determine the missing component can be used.

Using the example of FIG. 1 synthetic seismograms for various source mechanisms (strike-slip and tensile dipole) are computed in order to illustrate the analysis leading to a possible value of the missing sixth component of the full six component moment tensor of the source. In the first example the sixth component is determined as the value of $M_{22}$ which results in a maximum DC component.

Figure 2A:
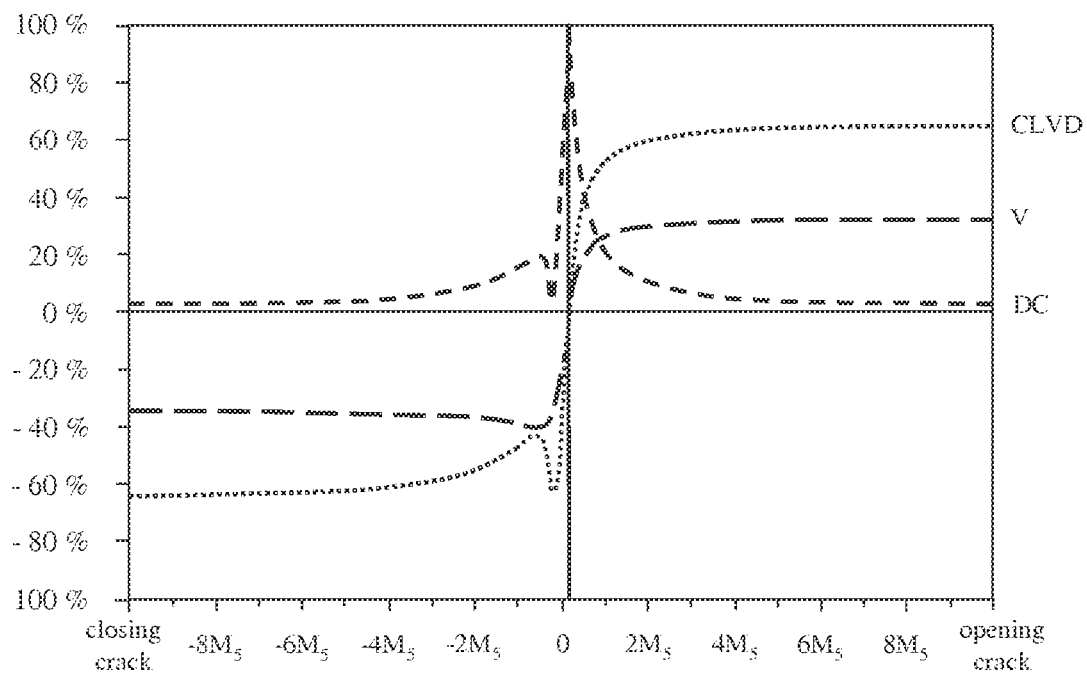
FIG. 2A shows subparts of a decomposed moment tensor as functions of a sixth component of the moment tensor for one microseismic source mechanism.

In the plot of FIG. 2A there are shown the results of a first tested source model using a strike-slip (i.e., dip 90° and rake 0°) with strike 0°. The plot shows the ratio of double-couple (DC—i.e., shear part of the mechanism), volumetric (V) and compensated linear vector dipole (CLVD) components of the moment tensor composed of the 5 constrained components completed with the various values of the $M_{22}$ component between −10 $M_5$ and 10 $M_5$ as explained above The moment tensor is decomposed using the Vavryčuk (2001) definitions where the source mechanism of a pure crack is represented by 33% volumetric and 67% CLVD components. The closing and opening crack, respectively, are represented by the left and right ends of spread of values for $M_{22}$.

The maximum DC component occurs for zero CLVD and volumetric components of the moment tensor, as specified by the input data. However, the plot also shows that the ratio of DC/CLVD/V components oscillates in the vicinity of the right solution making an inversion based on this ratio unstable.

Figure 2B:
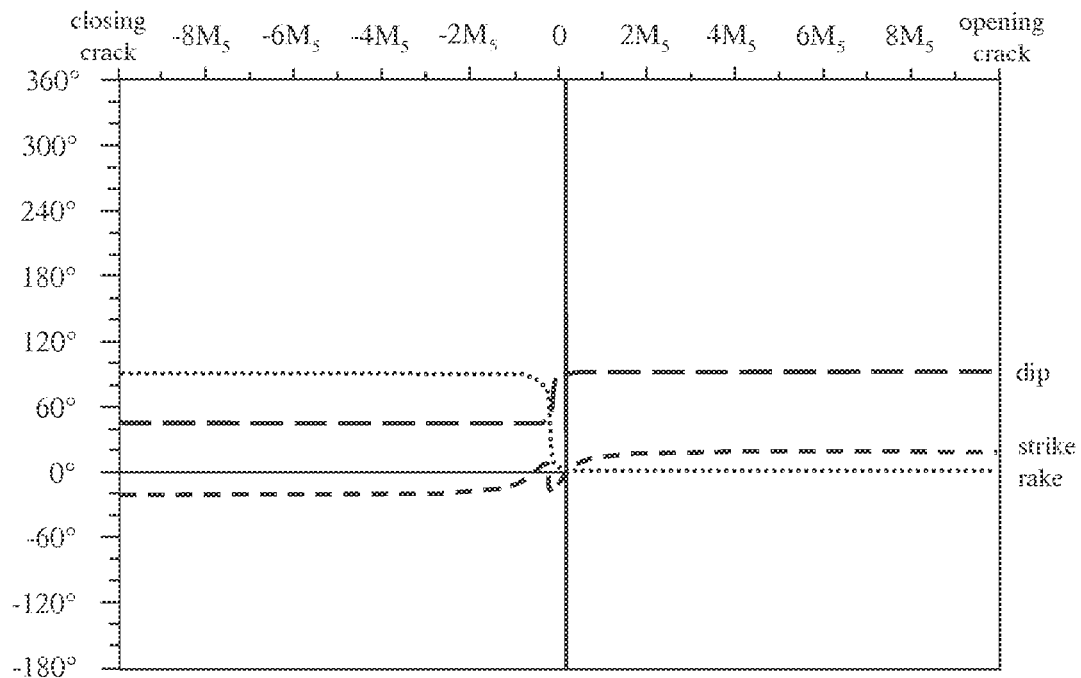
FIG. 2B shows dip, strike and rake angle of a microseismic event as functions of a sixth component of the moment tensor for the microseismic source mechanism of FIG. 2A.

Alternatively, the lower plot of FIG. 2B shows dependency of strike, rake and dip of DC component of the moment tensor as a function of the $M_{22}$ component. The correct solution (i.e., 100% DC component) with correct strike, rake and dip is one of the inverted solutions. The strike, rake and dip are found to be most meaningful only for moment tensor with large DC component (usually more than 20%).

The correct solution based on the maximum DC component is shown as a vertical line in the plots of FIGS. 2A and 2B.

Figure 3A:
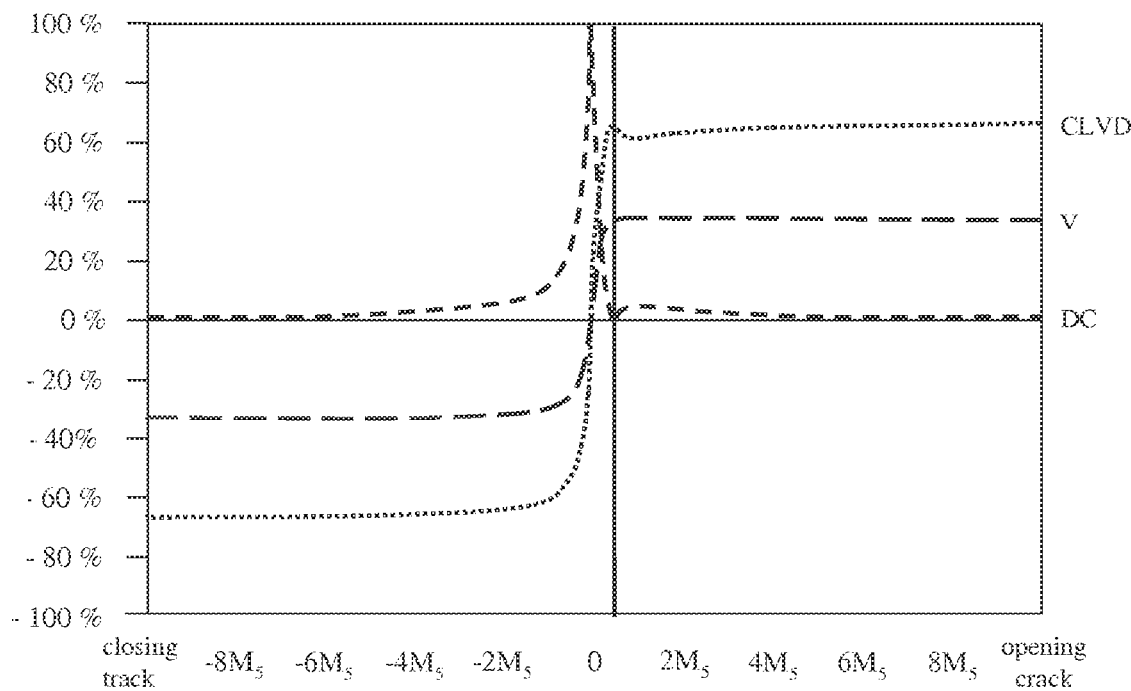
FIG. 3A shows subparts of a decomposed moment tensor as functions of a sixth component of the moment tensor for another microseismic source mechanism.
Figure 3B:
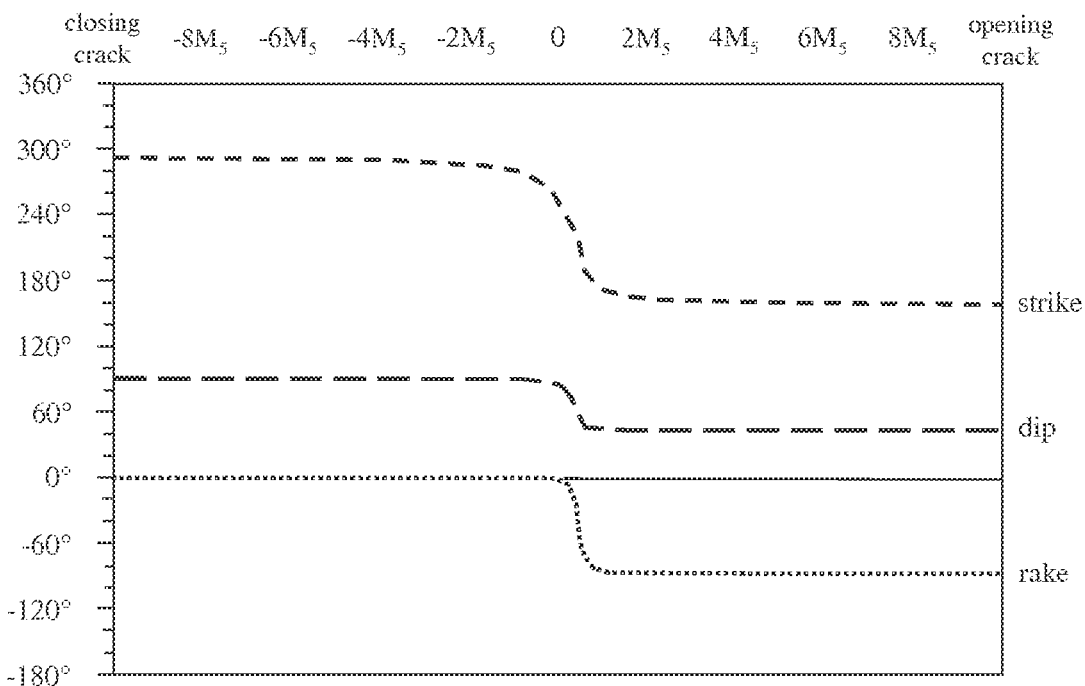
FIG. 3B shows dip, strike and rake angle of a microseismic event as functions of a sixth component of the moment tensor for the microseismic source mechanism of FIG. 3A.

The second synthetic test is a source mechanism of tensile dipole along east-west axis, i.e. the axis of tensile dipole forms an angle about 65° with the azimuth of $x_1$-$x_3$ plane where the receivers and the source are located. A tensile dipole represents an opening crack which is a possible source mechanism for seismic events induced by hydraulic fracturing. As in the previous example, FIG. 3A shows the ratios of DC, V and CLVD components of the inverted source mechanisms as a function of the possible values of $M_{22}$ and FIG. 3B shows strike, rake and dip angles of the DC component of the source as a function of the possible values of $M_{22}$. Again all source mechanisms have exactly the same fit to the input data and differ only in the unconstrained $M_{22}$ component.

The synthetics tests show that the right source mechanism is among the set of possible inverted solutions. Further constraints are used to select the correct solution. In the example of FIG. 3 the possible solutions are constrained by conditioning the strike of the DC part of the inverted source mechanism as the strike is found to be the least constrained parameter from the vertical array of receivers. Restricting the inverted strike to +/−5% leads to a clustering of the nodal planes using for example the Riedesel-Jordan (1989) representation of the source mechanism. In other words it appears that the source mechanism with correct strike is very close to the correct source mechanism.

It is seen as a further important aspect of the invention that even in cases where the exact source mechanism is not accessible through further analysis of the data, the above described plots allow to characterize a seismic event. One important observation can be for example if the plots show a DC component of less than 100% which can render the event as not consistent with a pure shear source mechanism.

Based on such or similar analysis of the possible source mechanisms given tensor components or source parameters as function of the sixth tensor component, measured events can be removed, classified or clustered to improve further analysis of the data. The analysis allows for example to distinguish microseismic events related directly to fluid movement from microseismic event caused by non-fluid movement such as pore-pressure diffusion or stress transfer by including or excluding shear events. The decomposition and representation of the moment tensor into volumetric and shear part enables monitoring and classification of microseismic events into with possible volume opening or closing due to fluid transport.

As another application which does not require the exact knowledge of the missing component, it is possible to determine from the fife inverted moment tensor coordinates a measure representative of the size of the observed event. For example the seismic moment released by the seismic event can be estimated as the maximum of the five elements of the moment tensor. The moment magnitude can then be estimated from the seismic moment as being proportional to a logarithm of the moment. With the knowledge of the moment or its magnitude it is possible to assess symmetry of the hydraulic fracture, detection thresholds, stress changes, and other parameters.

Figure 4:
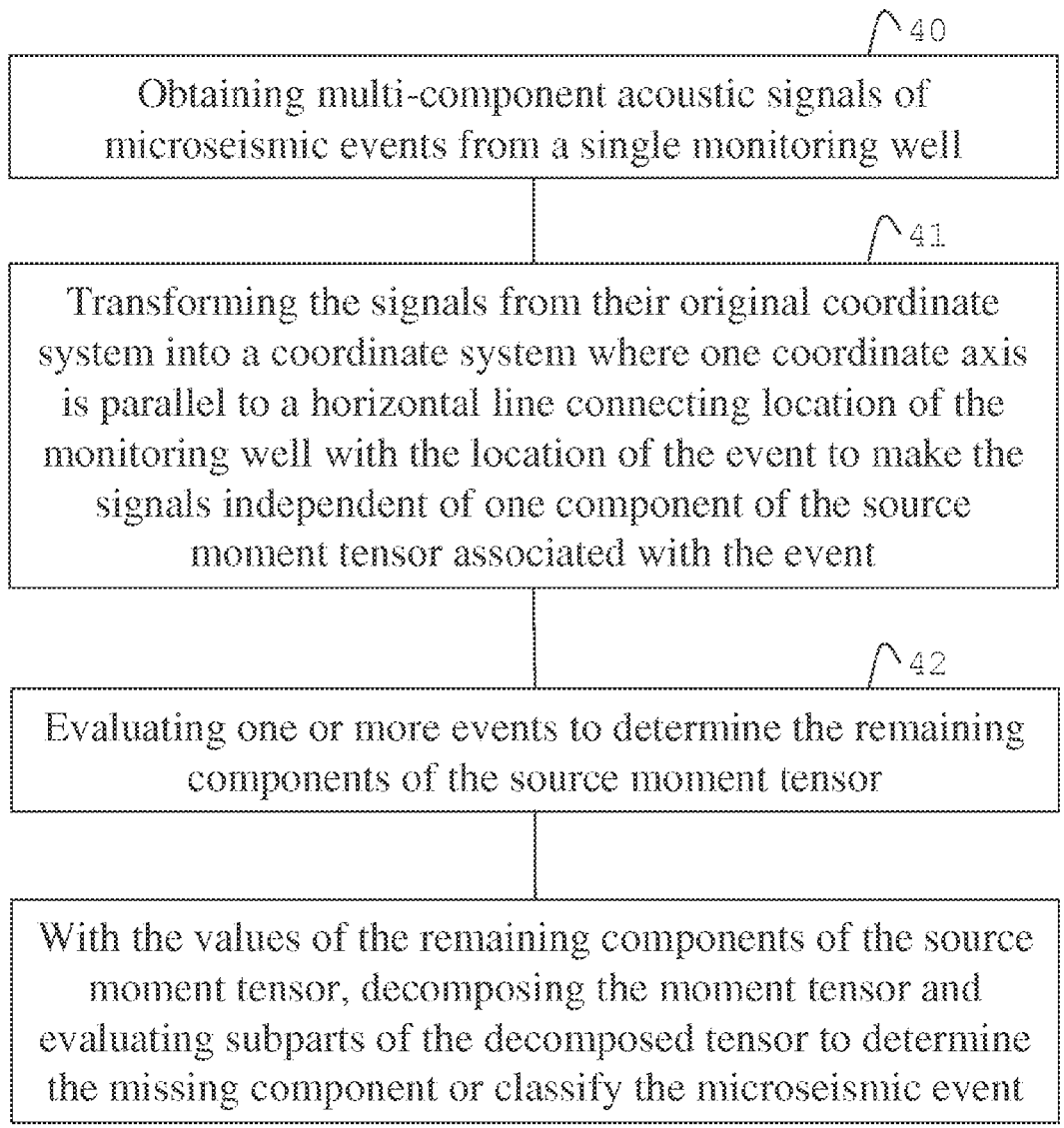
FIG. 4 is a flowchart of steps performed in an example of the present invention.

Some of the above described steps are summarized in the flowchart of FIG. 4. In the first Step 40 of FIG. 4, multi-component acoustic signals of microseismic events are obtained from a single monitoring well. Then in the Step 41, the signals are transformed from their original coordinate system into a coordinate system where one coordinate axis is parallel to a horizontal line connecting location of the monitoring well with the location of the event to make the signals independent of one component of the source moment tensor associated with the event. In the Step 42, the rotated signals are evaluated to determine the remaining components of the source moment tensor and in the Step 43 using the values of the remaining components of the source moment tensor, a decomposed version of the moment tensor is prepared and subparts of the decomposed tensor are evaluated to determine the missing component or classify the microseismic event. It can be a beneficial operation (not shown) to transform the moment tensor back into the original coordinate system of the signals or any other (absolute) coordinate system.

The invention claimed is:

1. A method of monitoring a subterranean formation comprising the steps of:
   using a plurality of geophones to obtain multi-component signals from an essentially single azimuthal direction relative to a location of a microseismic event within the formation;
   rotating the multi-component signals such that the multi-component signals become independent of at least one of the components of a moment tensor representing source characteristics of the microseismic event;
   deriving the remaining components of the moment tensor from the rotated multi-component signals;
   determining subparts of the moment tensor as functions of the at least one of the components and at least one of a dip, a strike or a rake angle of the microseismic event; and
   determining a possible value of the at least one of the components from an evaluation of the functions.

2. The method of claim 1, wherein the signal recordings are low-pass filtered or bandlimited to a frequency range within 0 to 100 Hz.

3. The method of claim 1, wherein the microseismic event is caused by a fracturing operation.

4. The method of claim 1, wherein the moment tensor has six components.

5. The method of claim 1, wherein the moment tensor has six independent components.

6. The method of claim 1, wherein the at least one of the components is a trace element of the moment tensor in matrix representation.

7. The method of claim 1, wherein the multi-component signals are rotated from the coordinate system of the acquisition into a coordinates system wherein one horizontal coordinate coincides with the azimuthal direction.

8. The method of claim 1, wherein the multi-component signals are obtained as recordings from a single monitoring well.

9. The method of claim 1, further comprising the step of decomposing the moment tensor into subparts representative of different source mechanisms and determining the values of the subparts as functions of the at least one of the components.

10. The method of claim 9, further comprising the step of determining a possible value of the at least one of the components from the evaluation of the function.

11. The method of claim 10, wherein the possible value is determined by the maximum of a subpart of the moment tensor representing the double-couple or shear related part of the source mechanism.

12. The method of claim 9, further comprising the step of classifying or removing microseismic events based on an evaluation of the functions.

13. A method of monitoring a subterranean formation comprising the steps of:
   receiving multi-component signals from a plurality of geophones, wherein the multi-component signals are from an essentially single azimuthal direction relative to a location of a microseismic event within the formation;
   rotating the multi-component signals such that the multi-component signals become independent of at least one of the components of a moment tensor representing source characteristics of the microseismic event;
   deriving the remaining components of the moment tensor from the rotated multi-component signals;
   determining subparts of the moment tensor as functions of at least one of the components; and
   determining a possible value of the at least one of the components from an evaluation of the functions.

14. The method of claim 13, wherein the possible value is determined by constraining variations on a strike angle of a double-couple subpart of the moment tensor and determining whether microseismic events cluster with the constrained strike angles.

* * * * *